US006386492B1

(12) United States Patent
Brown et al.

(10) Patent No.: US 6,386,492 B1
(45) Date of Patent: May 14, 2002

(54) TEMPORARY SIGN HOLDER

(75) Inventors: David M. Brown, Bel Air, MD (US); D. Bernard Heffernan, Harleysville; Nicholas J. Skoutelas, Chadds Ford, both of PA (US)

(73) Assignee: National Railroad Passenger Corporation, Washington, DC (US)

( * ) Notice: Subject to any disclaimer, the term of this patent is extended or adjusted under 35 U.S.C. 154(b) by 0 days.

(21) Appl. No.: 09/429,367

(22) Filed: Oct. 28, 1999

(51) Int. Cl.[7] ........................ F16M 13/00; G09F 17/00; B61L 5/20

(52) U.S. Cl. ................. 248/124.1; 246/477; 238/14.14; 116/173

(58) Field of Search .............................. 248/124.1, 551, 248/552, 553, 229.14, 229.15, 229.24, 228.5, 231.61; 246/447; 238/14.14; 73/866.3; 116/173

(56) References Cited

U.S. PATENT DOCUMENTS

| | | | | | |
|---|---|---|---|---|---|
| 269,955 | A | | 1/1883 | Paullin | |
| 418,155 | A | | 12/1889 | Berry | |
| 606,197 | A | | 6/1898 | Dunn | |
| 822,195 | A | | 5/1906 | Eaton | |
| 1,297,521 | A | | 3/1919 | Van Dresar | |
| 1,301,914 | A | * | 4/1919 | Currie | 246/477 |
| 1,320,380 | A | | 11/1919 | Currie | |
| 1,361,308 | A | | 12/1920 | Currie | |
| 1,458,808 | A | * | 6/1923 | Conley | 246/477 |
| 1,747,278 | A | * | 2/1930 | Zawyruchia | 116/173 |
| 2,061,871 | A | | 11/1936 | Hester | |
| 3,059,884 | A | * | 10/1962 | Stanfill | 248/68.1 |
| 3,481,381 | A | * | 12/1969 | Black | 411/162 |
| 4,429,845 | A | * | 2/1984 | Stover et al. | 246/428 |
| 5,038,704 | A | | 8/1991 | Dean et al. | |
| 5,601,259 | A | * | 2/1997 | DiChiara | 246/203 C |
| 5,836,558 | A | * | 11/1998 | Kulp et al. | 248/218.4 |
| 5,905,216 | A | * | 5/1999 | Davis | 73/866.3 |

* cited by examiner

*Primary Examiner*—Anita King
(74) *Attorney, Agent, or Firm*—Lowe Hauptman Gilman & Berner, LLP

(57) ABSTRACT

A temporary sign holder utilizes a clamping member attachable to a rail to support a sign post in an operative location. The clamping member is formed with two hooked shaped members that are tightened around the base of the rail from opposing sides. One of the hooked members has a threaded rod extending through a sleeve on the other hooked member with a locking ring threaded onto the rod to provide a tightening arrangement. A horizontal member extends outwardly from the hook shaped members. This arrangement enables the hooked shaped members to be pressed inwardly towards each other towards the rail web to provide a heightened degree of clamping force capable of resisting vibrational and other forces that occur as a result of train passage. A lock prevents unauthorized loosening of the locking ring to create a tamper-proof structure.

20 Claims, 3 Drawing Sheets

TEMPORARY SIGN HOLDER

TECHNICAL FIELD

The present invention relates generally to sign holders and, more particularly, to a sign holder for temporary use along railway lines.

BACKGROUND ART

Temporary sign holders are used to alert railway personnel, particularly locomotive operators, as to unsafe track conditions, and the presence of personnel and equipment working in proximity to an active track. The use of electronic signaling equipment is known, however, such electronic devices are expensive both to install and maintain on a permanent basis. As a result, track areas within some railway systems are unserviced by signaling devices and therefore cannot warn approaching trains with respect to the existence of temporary speed restrictions, workers and equipment working in proximity to the tracks, and other conditions generally considered unsafe for railway traffic.

Governmental regulations require the presence of temporary warning devices positioned at appropriate places to advise train operating personnel of hazardous and possibly unsafe conditions that are being approached. For that purpose, temporary flagging devices are embodied in different forms. For example, one type of temporary flagging device is simply driven into the ground or ballast material. One of the problems associated with these temporary flagging structures is that two workers are required to install the device. Typically, one worker holds the flagging device while the other worker wields a sledge hammer to drive the device into the supporting ground or structure. This prior art approach utilizes excessive manpower, requires both considerable time to both drive the temporary flagging device into the supporting structure and remove the same after the intended use. This is because the track is often laden with rocks or may also be frozen which makes it difficult to properly apply the temporary flagging device.

Since train operating personnel must rely upon such temporary flagging devices, it is critical that these devices remain in situ throughout the entire period of intended use. One major problem involves the virtual impossibility of maintaining these temporary devices in proper flagging position, due to human factors, such as vandalism and theft, and environmental factors, such as wind, erosion, earthquakes, animals, flooding, etc. These problems are exacerbated due to the requirement that the flagging device be sufficiently lightweight and portable to enable easy transit to the installation site.

U.S. Pat. Nos. 1,320,380 and 1,361,308, both to A. L. Currie, disclose railway flagging devices that are operatively mounted to one of the rails with a clamping arrangement to which is attached a tubular member projecting upwardly and outwardly away from the rail to support signage. The clamping member essentially includes a clamping base terminating at one end in a U-shaped flange adapted to embrace one edge of a lower flange of the rail. A clamping member is slidably mounted to the base to abut against the opposite lower flange of the rail. A bolt connecting the clamping member to the base is tightened to exert a downward force acting perpendicular to the lower flange of the rail to press the clamping member thereagainst. Similar clamping arrangements are also disclosed in U.S. Pat. No. 5,038,704 to Dean et al wherein a wing nut and bolt combination are provided to exert a downward force against a clamping plate engaging the upper surface of one of the lower flanges of the rail.

One of the problems associated with these prior art track engaging components is that they are not structured or designed to withstand strenuous track conditions as created by modern day rail systems and are therefore inherently susceptible to mechanical failure. For example, the tremendous vibration transmitted through the rail to the clamping mechanism as a result of train passage has the capability of gradually loosening the clamping member pressing against the lower flange, creating an unsafe condition. Additionally, the amount of clamping force provided by these prior art clamping systems is low since these systems are incapable of being initially tightened to a degree that provides a high degree of clamping capable of resisting tampering or certain types of environmental conditions.

It is accordingly an object of the present invention to provide a temporary sign holder that can be non-destructively attached to a rail with a high degree of clamping force.

Another object is to provide a temporary sign holder capable of maintaining an appropriate train clearance envelope.

Still another object is to provide a temporary sign holder that is safe for employees to work around.

Yet another object is to provide a sign holder that is tamper proof and capable of easy installation and removal with minimal maintenance crew (e.g., one worker).

SUMMARY OF THE INVENTION

The present invention is directed to a temporary sign holder attachable to a rail base which projects from opposite sides of a rail web supporting a rail head to provide a support for temporary signage observable by both train operating personnel and maintenance personnel. The holder comprises a support base and a post connected to the support base to extend outwardly away from the rail and support signage. To firmly mount the temporary sign holder to the rail, the temporary sign holder includes first and second clamps interconnected to each other and being formed with angled or curved clamping sections that respectively engage opposite parallel lower flanges of the rail base. A tightening mechanism interconnecting the first and second clamping members is manually operated to move the clamping members towards each other into progressively tighter clamping contact with the rail base. The temporary sign holder is advantageously supported by the rail itself in such a manner so that it will effectively maintain signage at a proper position throughout the duration of its intended use. The design, construction and cooperative inter-relationship of the elements reduces risks of mechanical damage or operational failure and is easily transportable and installable through the efforts of one worker.

The first clamping member preferably includes a first clamping rod that is hooked at one end thereof and threaded at the opposite end. The second clamping member is preferably formed with a plate having a curved or angled section along one edge. A surface of the plate supports a hollow sleeve that is open at opposite ends thereof to permit entry and passage of the first clamping rod therethrough. In operative position, the threaded end of the first clamping rod extends from the sleeve to receive a nut that is rotatable to urge the clamps towards each other into progressively tighter clamping contact with the rail base.

In the preferred embodiment, the nut is formed on a circular plate having a relatively large diameter of one to four inches. By providing a large diameter circular plate, the worker can easily grasp and rotate the plate to turn the nut with sufficient torque to effectively install the sign holder to the rail with appropriate clamping force.

In accordance with a further feature of the preferred embodiment, the nut is located in the center of the tightening plate. A plurality of circumferentially spaced openings are located for selective alignment with a corresponding opening formed in a mounting tab attached to the sleeve. After the circular plate is tightened with sufficient force, the worker ensures that one of the plate holes is in alignment with the tab opening to thereby enable installation of a lock to protect the installed holder from acts of vandalism, theft or other unauthorized trespass.

A method of temporarily securing signage to a railway rail is also disclosed. The method comprises the steps of loosely mounting first and second clamps to opposite longitudinally extending lower flanges of a rail base by passing one of the clamps beneath the rail into contact with an inward facing one of the flanges. The clamps are then tightened together with a tightening mechanism having a clamping axis extending transversely to the rail longitudinal axis.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
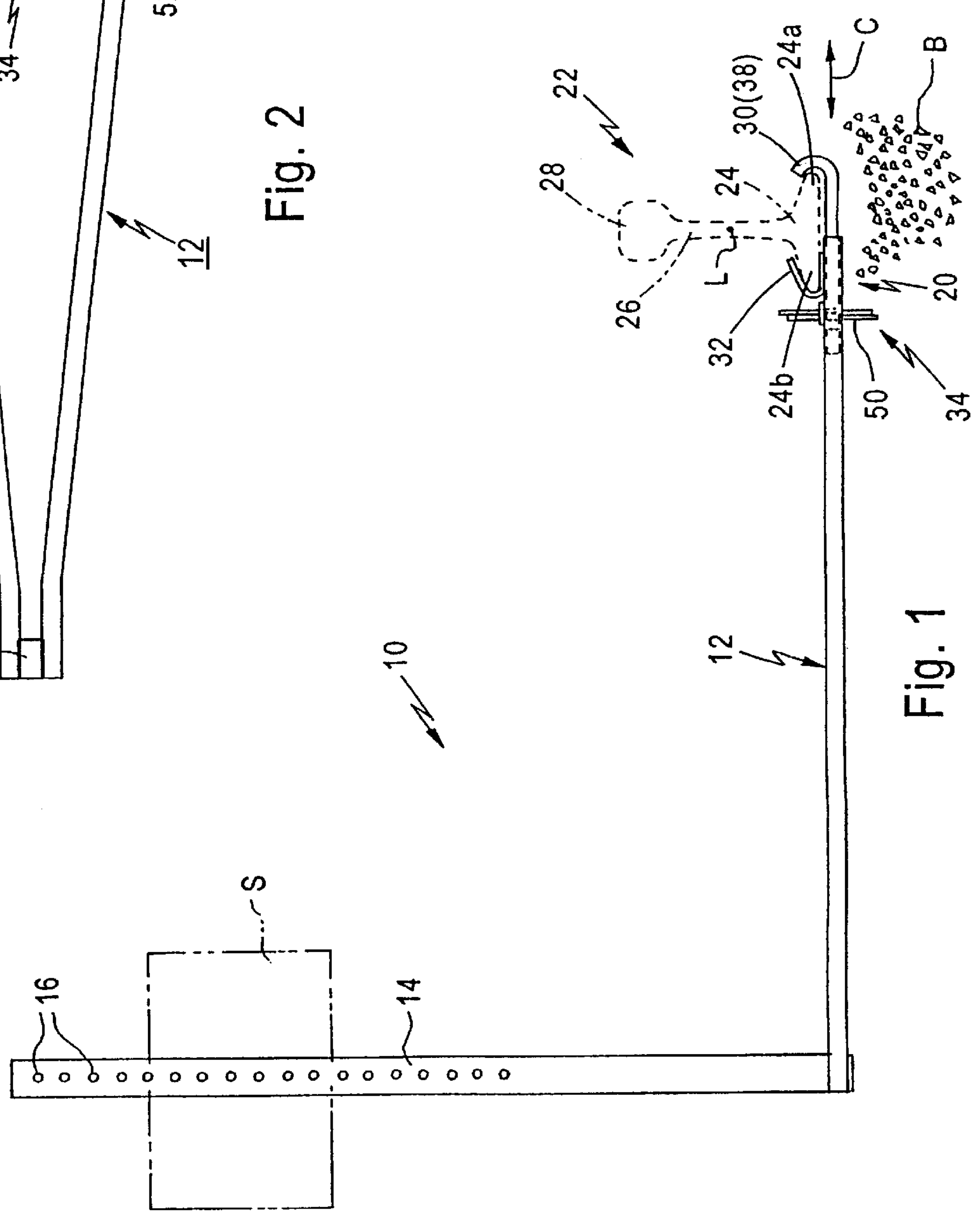
FIG. 1 is a side elevational view of a temporary sign holder in accordance with the present invention.

Referring to FIG. 1, a temporary sign holder generally designated with reference numeral 10 is comprised of a generally horizontally extending support base 12 supporting a vertically extending post 14 fixedly secured to project upwardly from an outer end of the support base. A plurality of vertically spaced openings 16 are formed in an upper portion of the post 14 to enable signages S to be adjustably mounted at an appropriate height in an appropriate position so as to be observable by both train operating personnel and maintenance personnel. In accordance with the unique features set forth below, temporary sign holder 10 is of lightweight portable construction that is equipped with a novel clamping mechanism 20 enabling the base 12 to be supported on a rail 22 in an easily detachable manner.

Each of two identical rails 22 (only one depicted for ease of illustration ) is formed with a rail base 24 having first and second lower flanges 24*a* and 24*b* projecting from opposite sides of a rail web 26 that extends upwardly to support the rail head 28 rollably engaged by the train wheels. The rails 22 are supported in a parallel spaced relationship with a rocky ballast material, B as is well known. The clamping mechanism 20 includes first and second rail base engaging sections 30 and 32 having an angled or curved section respectivley adapted to engage the lower flanges 24*a*,24*b* as a result of loosely positioning these clamping sections into contact with the flanges by passing one of the rail base engaging sections beneath the rail base 24 after first removing some of the ballast material B. Following this initial positioning of the first and second clamping sections 30 and 32 in respective contact with the rail base lower flanges 24*a*,24*b*, a tightening mechanism generally designated with reference numeral 34 is manually rotated by the installer so that the clamping sections 30,32 begin to move towards each other into progressive tighter contact with the rail flanges 24*a*,24*b* a long a horizontal clamping axis C extending perpendicular t o the longitudinal axis L of the rail 22. As will be seen more fully below, this unique clamping mechanism 20 enables the rail engaging components 30,32 to withstand a strong clamping force capable of withstanding vibration and other hostile dislodging forces likely to occur during intended use.

Figure 2:
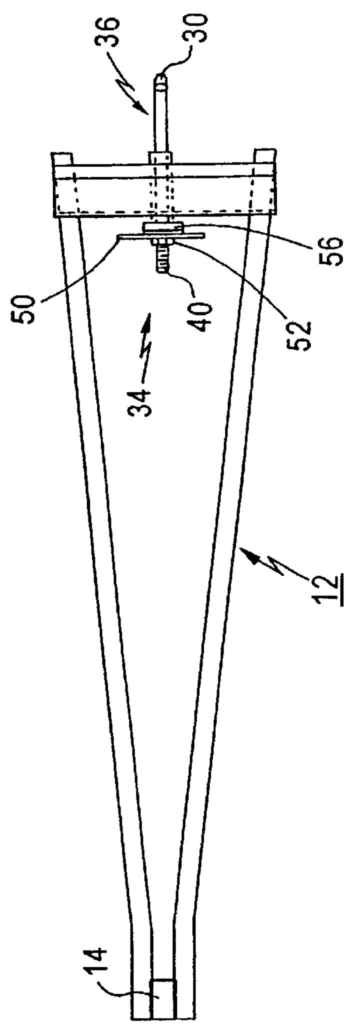
FIG. 2 is a top plan view of the sign holder of FIG. 1.
Figure 3:
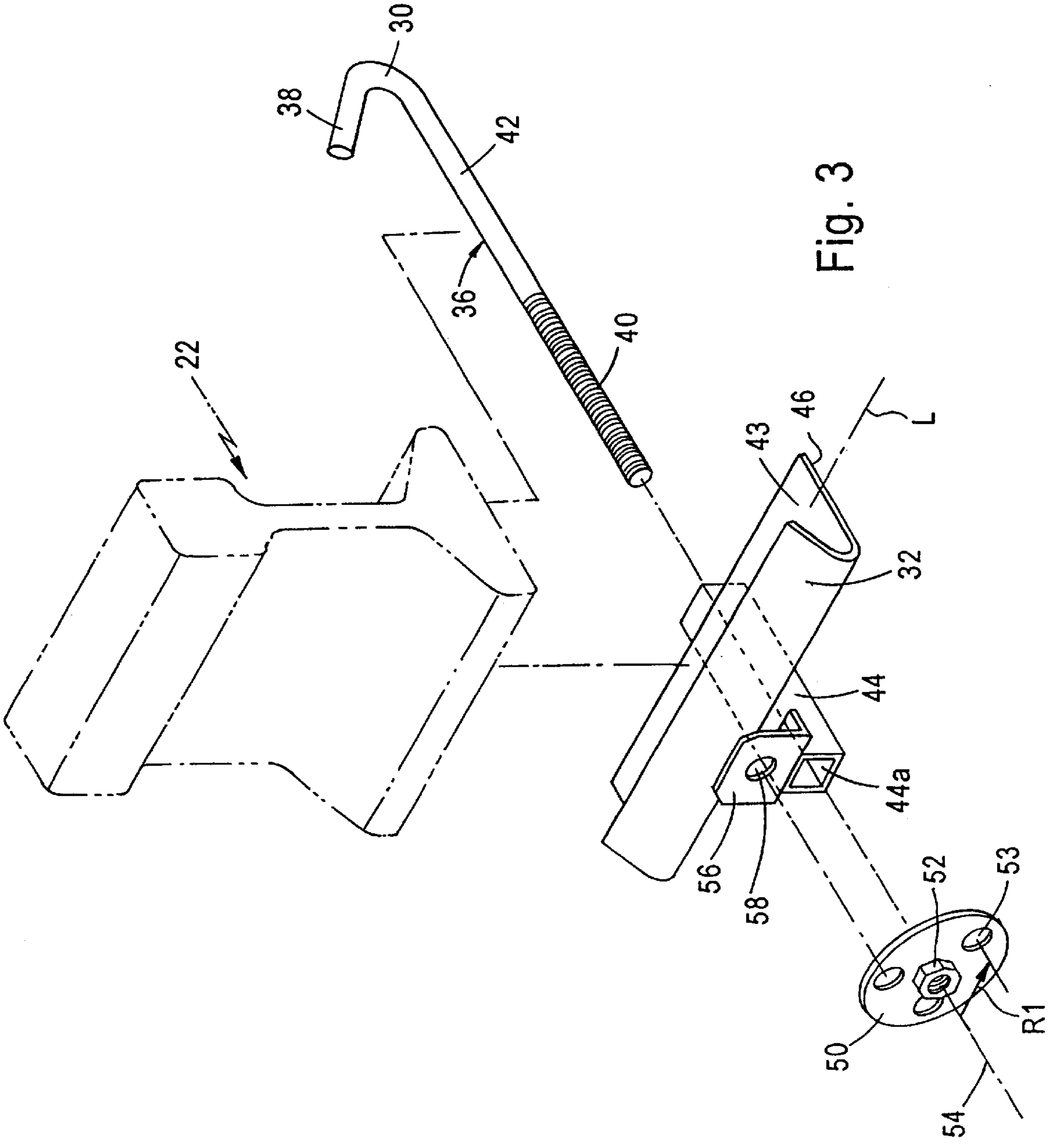
FIG. 3 is an exploded perspective view of a unique clamping mechanism for securing the sign holder to a railway rail or other support.

Referring to FIGS. 2 and 3, the first rail base engaging section 30 includes a rod 36 (e.g., a ½ inch diameter×12¾ inch threaded hook bolt) formed with a hook 38 at one end and a threaded section 40 at its opposite end with the remaining section 42 of the rod preferably being unthreaded. The second rail base engaging section 32 is preferably a rectangular plate 43 having one lengthwise edge curved to form the second clamping section. The nominal dimensions of this plate 43 in the preferred embodiment are ⅛ inch×4½ inch×8 inches. A square sleeve 44 is welded to the flat lower surface 46 of the second rail base engaging plate 43 to extend transverse to the longitudinal axis L of the plate. The outer end 44*a* of the square sleeve 44 projects laterally outwardly from the second clamping section 32 for purposes which will become apparent below. The first clamping rod 36 extends through the sleeve 44 so that the threaded end portion 40 projects outwardly from this sleeve outer end opening 44*a* to receive a tightening washer 50 threadedly mounted thereon through a nut 52 fixed to the center of the washer. In this manner, as will be apparent from FIGS. 1 and 3, manual rotation of the tightening washer 50 causes the nut 52 to advance along the threaded rod portion 40, towards hooked end 38, and thereby draw the first and second clamping sections 30,32 into progressively tighter clamping contact with the rail base flanges 24*a*,24*b*.

By locating the clamping axis C in a direction transverse to the rail longitudinal axis L, an extremely high degree of clamping force can be transmitted by rotation of the nut 52 along the threaded rod section 40, limited only by the tensile load that the threads are signed to withstand.

Figure 5:
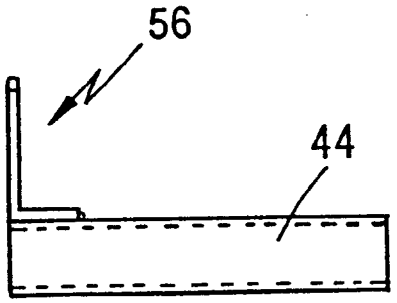
FIG. 5 is a side elevational view of the sleeve arrangement FIG. 4.
Figure 6A:
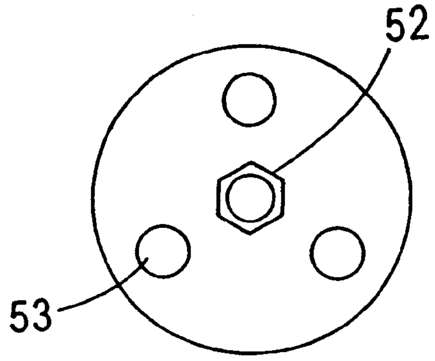
FIGS. 6A and 6B are plan and side views of a tightening ring of the clamping mechanism.
Figure 6B:
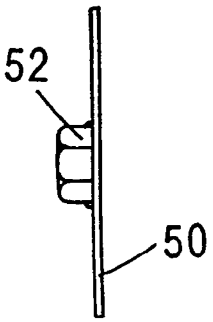

The tightening washer 50 (preferably ⅛ inch×3¼ inch) is preferably formed with circumferentially spaced openings 53 (FIGS. 6A and 6B) located at a predetermined radial distance $R_1$ from the threaded nut axis 54 (FIG. 3). The rectangular sleeve 44 preferably supports an angle having a tab 56 (FIG. 5) welded thereto that also has an opening 58 (FIGS. 3 and 4) spaced a distance $R_1$ from the clamping axis C extending through the longitudinal center of the sleeve 44. In this manner, after the tightening washer 50 is rotated to clamp the assembly 20 to the rail 22, the installer rotates the washer to create alignment between the openings 53,58. This enables a lock not shown to secure the clamping members 30,32 together to prevent vandalism and unauthorized removal.

It will now be apparent to persons skilled in the art that the invention is possessed of numerous advantages and features that may be used individually or in combination with each other. For example, the feature of locating the clamping axis C in a direction transverse to the rail longitudinal axis L maximizes the application of clamping force in order to achieve safe and reliable clamping action. The feature of using a large diameter washer 50 to rotate the clamping nut 52 eliminates the need for wrenches and other tools by providing an effective means for imparting the necessary torque to the nut in order to obtain a proper clamping force. However, if desired, it will be appreciated that the nut 52 preferably includes driven surfaces capable of being manipulated by a wrench or other hand tool. Finally, the formation of circumferentially spaced washer openings 53 may be seen to perform a dual function. Apart from locking the clamps together, it is also possible for a workman to insert a screwdriver or like implement through one of the holes 53 in order to grasp the screwdriver handle to rotate the locking washer 50 with increased mechanical advantage.

Figure 4:
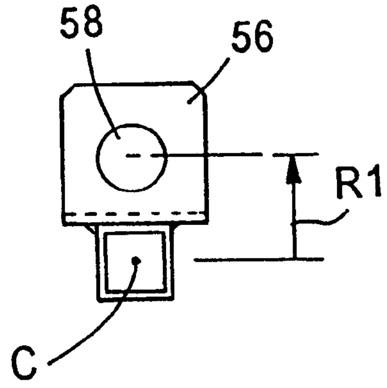
FIG. 4 is an end elevational view of a sleeve arrangement forming a part of the clamping mechanism.

The mounting tab 56 may be located to extend downwardly from the rectangular sleeve 44 instead of upwardly as depicted in FIG. 4. This downward orientation would have the added advantage of enhancing the anti-theft characteristics by making it more difficult to tamper with the lock.

In the preferred embodiment, the support base 12 is preferably welded or otherwise fixedly secured to the post 14 to ensure a fixed angular orientation. Although it is within the scope of the invention to pivotally secure the post 14 to the support base 12 and provide adjustable degrees of angular orientation, it is believed that such type of adjustment would increase the likelihood of vandalism or the inadvertent application of force (e.g., caused by high wind) that might tilt these posts onto the rail.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A temporary sign holder attachable to a rail base formed with first and second rail base flanges which project from opposite sides of a rail web supporting a rail head to provide a support for temporary signage observable by both train operating personnel and maintenance personnel, comprising:

(a) a support base including at least a pair of spaced support members;

(b) a post connected to one end of the support members of the support base and being adapted to support said signage;

(c) a first rail base engaging section including an angled or curved first clamping section adapted to engage the first rail base flange;

(d) a second rail base engaging section including an angled or curved second clamping section adapted to engage the second base flange, one of said first and second rail base engaging sections being respectively attached at opposite ends thereof to opposite spaced apart ends of said support members of the support base; and (e) a threaded tightening mechanism formed between said first and second rail base engaging sections and having a clamping axis extending transverse to the rail longitudinal axis for selectively moving said first and second rail base engaging sections towards each other in the direction of the rail web and thereby into and out of clamping contact with the rail base.

2. The temporary sign holder of claim 1, wherein said first base engaging section includes a threaded bolt portion at one end thereof and said first clamping section at an opposite end thereof, said second rail base engaging section including an opening through which said threaded bolt portion extends when said first and second rail base engaging sections are operatively connected to each other.

3. The temporary sign holder of claim 2, further comprising a sleeve attached to a bottom portion of said second rail base engaging section and extending transversely to receive said first rail base engaging section, said opening being defined by an end of said sleeve through which opening said threaded bolt portion extends.

4. The temporary sign holder of claim 3, wherein said first rail base engaging section includes an unthreaded rod portion extending between said first clamping section and said threaded bolt portion, said unthreaded rod portion being disposed within said sleeve.

5. The temporary sign holder of claim 4, wherein said first clamping section is a hooked shaped portion having a distal end angled inwardly toward said threaded bolt portion.

6. The temporary sign holder of claim 3, wherein said tightening mechanism includes a plate formed with a threaded section adapted to receive the threaded bolt portion therethrough, whereby rotation of said plate draws the first clamping section towards the second clamping section and into clamping contact with said rail base flanges.

7. The temporary sign holder of claim 6, wherein said tightening plate is of circular shape.

8. The temporary sign holder of claim 6, wherein said tightening plate is adapted to bear against an end of said sleeve facing away from said rail.

9. A temporary sign holder attachable to a rail base formed with first and second rail base flanges which project from opposite sides of a rail web supporting a rail head to provide a support for temporary signage observable by both train operating personnel and maintenance personnel, comprising:

(a) a support base;

(b) a post connected to the support base and being adapted to support said signage;

(c) a first rail base engaging section including an angled or curved first clamping section adapted to engage the first rail base flange;

(d) a second rail base engaging section including an angled or curved second clamping section adapted to engage the second base flange, one of said first and second rail base engaging sections being attached to the support base; and (e) a threaded tightening mechanism formed between said first and second rail base engaging sections and having a clamping axis extending transverse to the rail longitudinal axis for selectively moving said first and second rail base engaging sections towards each other in the direction of the rail web and thereby into and out of clamping contact with the rail base, wherein said first base engaging section includes a threaded bolt portion at one end thereof and said first clamping section at an opposite end thereof, said second rail base engaging section including an opening through which said threaded bolt portion extends when said first and second rail base engaging sections are operatively connected to each other, further comprising a sleeve attached to a bottom portion of said second rail base engaging section and extending transversely to receive said first rail base engaging section, said opening being defined by an end of said sleeve through which opening said threaded bolt portion extends, wherein said tightening mechanism includes a plate formed with a threaded section adapted to receive the threaded bolt portion therethrough, whereby rotation of said plate draws the first clamping section towards the second clamping section and into clamping contact with said rail base flanges, and wherein said tightening plate includes at least one opening and said sleeve includes a mounting tab also formed with an opening therein, whereby alignment of said respective openings with each other enables a locking mechanism to be inserted through the aligned openings to lock the plate to the sleeve and thereby prevent unauthorized removal of said first and second clamping sections from the rail.

10. The temporary sign holder of claim 9, further comprising said locking member.

11. The temporary sign holder of claim 9, further comprising a plurality of said openings formed on the tightening plate.

12. The temporary sign-holder of claim 9, wherein said tab extends upward from the sleeve.

13. The temporary sign holder of claim 9, wherein said tab extends downward from said sleeve.

14. The temporary sign holder of claim 4, wherein said sleeve has a passage of square cross section and said bolt portion is of circular cross section for ease of entry into said sleeve.

15. The temporary sign holder of claim 14, wherein the diameter of the bolt portion is approximately equal to the width of the sleeve passage.

16. A temporary sign holder attachable to a rail base which projects from opposite sides of a rail web supporting a rail head to provide a support for temporary signage observable by both train operating personnel and maintenance personnel, comprising:

(a) a support base;

(b) a post connected to the support base and being adapted to support said signage;

(c) a first clamp and a second clamp respectively formed with a clamping section adapted to respectively engage said rail base along opposing parallel edges thereof;

(d) a tightening member interconnected to said first and second clamping sections and being operable to move said clamping sections towards each other in the direction of the rail web; and (e) a locking member for locking said tightening member in its tightening position to prevent unclamping of said first and second clamping sections.

17. A temporary sign holder comprising:

(a) a support base;

(b) a post connected to the support base and being adapted to support said sign;

(c) a first rail engaging section including an angled or curved first clamping section adapted to engage a portion of a rail base;

(d) a second rail engaging section including an angled or curved second clamping section adapted to engage another portion of said rail base, one of said first and second rail engaging sections being attached to the support base; and (e) a threaded tightening mechanism formed between said first and second rail engaging sections and having a clamping axis extending transverse to the rail base longitudinal axis for selectively moving said first and second rail base engaging sections towards each other in the direction of a rail web and into and out of clamping contact with the rail base, wherein said threaded tightening mechanism includes a plurality of openings to facilitate manual grasping and tightening interaction of said threaded tightening mechanism.

18. A method of temporarily securing a sign holder to a rail, comprising the steps of:

(a) positioning first and second clamps into loose contact with opposite sides of parallel lower rail flanges by passing one of said first and second clamps into a space beneath the rail;

(b) tightening said first and second clamps into respective contact with the lower flanges by moving said first and second clamps towards each other along a clamping axis extending perpendicular to a longitudinal axis of said rail in the direction of a rail web; and (c) locking said first and second clamps into a tightened position utilizing a locking mechanism.

19. The method of claim 18, wherein said space is formed in ballast material on which said rail is supported.

20. The method of claim 18, comprising the further step of locking said first and second clamps together to prevent unauthorized tampering and removal from said rail flanges.

* * * * *